Aug. 25, 1925.

H. A. KELTY 1,550,967

INTERNAL COMBUSTION ENGINE

Filed June 19, 1925   2 Sheets-Sheet 1

WITNESSES

INVENTOR
Harry A. Kelty
BY
ATTORNEYS

Aug. 25, 1925.  
H. A. KELTY  
INTERNAL COMBUSTION ENGINE  
Filed June 19, 1925  
1,550,967  
2 Sheets-Sheet 2

WITNESSES  
INVENTOR  
Harry A. Kelty,  
BY  
ATTORNEYS

Patented Aug. 25, 1925.

1,550,967

UNITED STATES PATENT OFFICE.

HARRY A. KELTY, OF NEW CASTLE, PENNSYLVANIA.

INTERNAL-COMBUSTION ENGINE.

Application filed June 19, 1925. Serial No. 38,294.

*To all whom it may concern:*

Be it known that I, HARRY A. KELTY, a citizen of the United States, and a resident of New Castle, in the county of Lawrence and State of Pennsylvania, have invented certain new and useful Improvements in Internal-Combustion Engines, of which the following is a specification.

This invention relates to a device for introducing a liquid or combination of liquids in the form of a vapor into the combustible mixture passing through the intake manifold of an internal combustion engine, and more particularly to a device described and claimed in my co-pending application Serial No. 25,695 filed April 24, 1925 of which the present case is a continuation in part.

Heretofore devices have been provided which are directly connected to the exhaust manifold by means of tubing coiled about said manifold for not only vaporizing a liquid but for converting the liquid into steam so that a greater quantity of the liquid in the form of hot vapor or steam is ordinarily employed than is required. Valves have been employed in connection with such devices in attempting to control the quantity of such steam or vapor admitted to the combustible mixture but such regulation has been ineffective because of the fact that the operator of a car cannot always determine from a mere inspection of the operation of the motor whether the proper quantity of the vapor or steam is being used for a particular operation of the engine.

It is an object of the present invention to provide a device for supplying the combustible mixture passing through the intake manifold of an engine with a vapor formed from alcohol or a mixture of alcohol and water, the vaporization of such fluids being controlled directly by the pocketing of a quantity of exhaust gases about a container in which the fluids are vaporized so that the heating of the fluids will never be greater than a predetermined degree.

Another object of the invention is the provision of a device adapted to be associated with the exhaust manifold of an internal combustion engine, but not directly connected thereto and in which a heating chamber is formed about a vaporizing chamber, with the exhaust manifold supplying the heating chamber initially with a predetermined quantity of hot exhaust gases but without permitting a general circulation of the gases through the heating chamber whereby the fluids in the vaporizing chamber will always supply the combustible mixture with a limited quantity of vapors only, for not only increasing the efficiency of the engine in power but for removing and maintaining the engine cylinders free of carbon.

A further object of the invention is the provision of a device for supplying vapor formed of a solution of alcohol and water to the cylinders of an internal combustion engine, the quantity of vapor being controlled by a predetermined degree of heat which is affected by by-passing a predetermined quantity of hot exhaust gases to a heating chamber placed in close association with the solution and a valve actuated by a thermostat for controlling the flow of the exhaust gases to the heating chamber.

A still further object of the invention is the provision of a device for supplying vapor formed of alcohol and water to the combustible mixture of an internal combustion engine and in which is included a container of limited capacity connected at points above the level of the liquid with the intake manifold of an engine and with a tank for supplying the container with alcohol and water, a float controlled valve being employed to maintain the level of the liquid constant.

Other objects include a method for supplying an internal combustion engine with vapor formed of definite quantities of aqueous and alcoholic vapors.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

Figure 1:
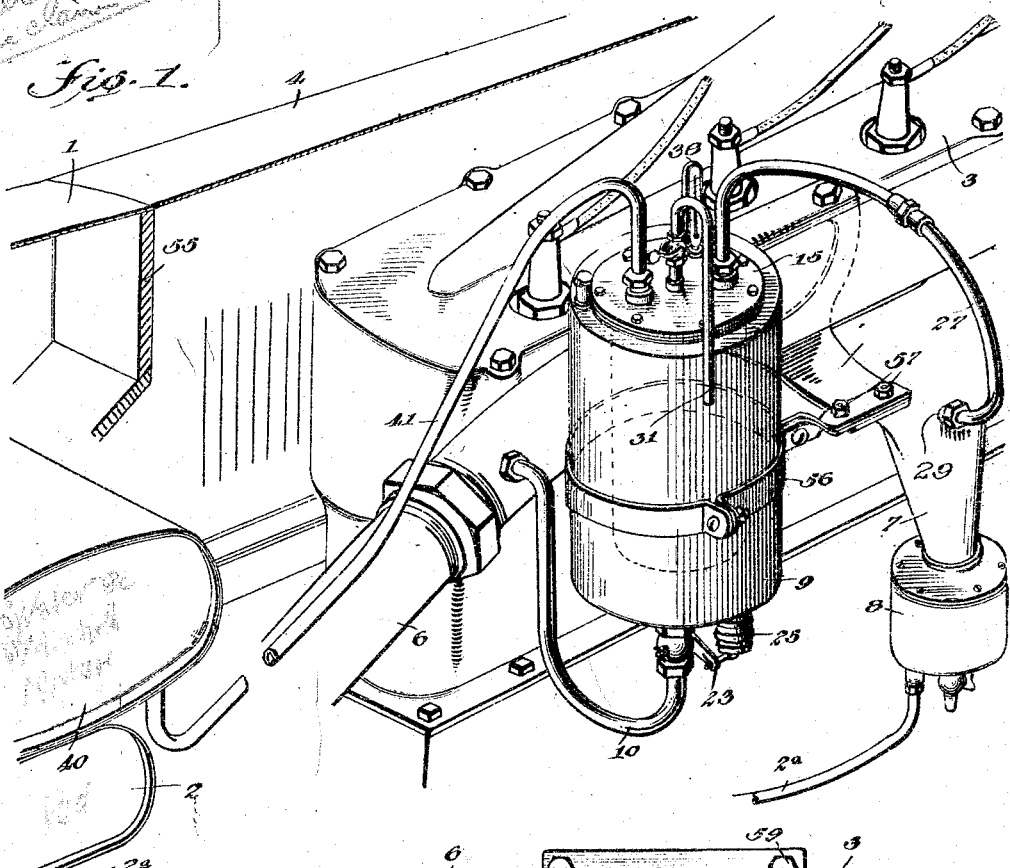
Figure 1 is a view in perspective of my auxiliary charge forming device applied to an automobile engine.
Figure 2:
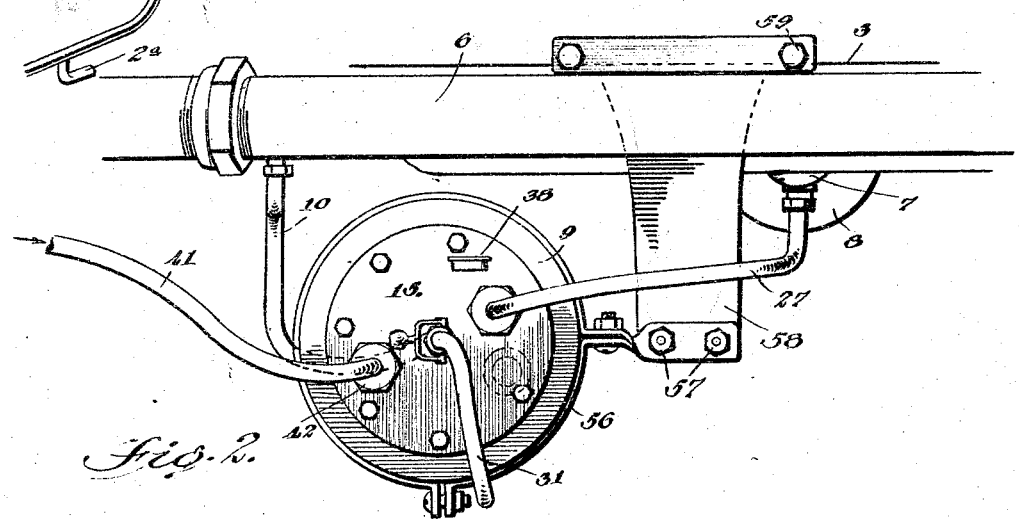
Figure 2 is a plan view of the same.

Referring more particularly to the drawings, 1 designates an automobile having a gasoline supply tank 2 and an internal combustion engine generally designated by the numeral 3. The engine is enclosed within a hood 4 which aids in the particular instance for maintaining the heat of the engine about a vaporizing device. The engine is provided with the usual exhaust manifold 6, an intake manifold 7 and a carbureter 8. The carbureter is supplied with gasoline from the tank 2 by a conduit 2ª.

Figure 3:
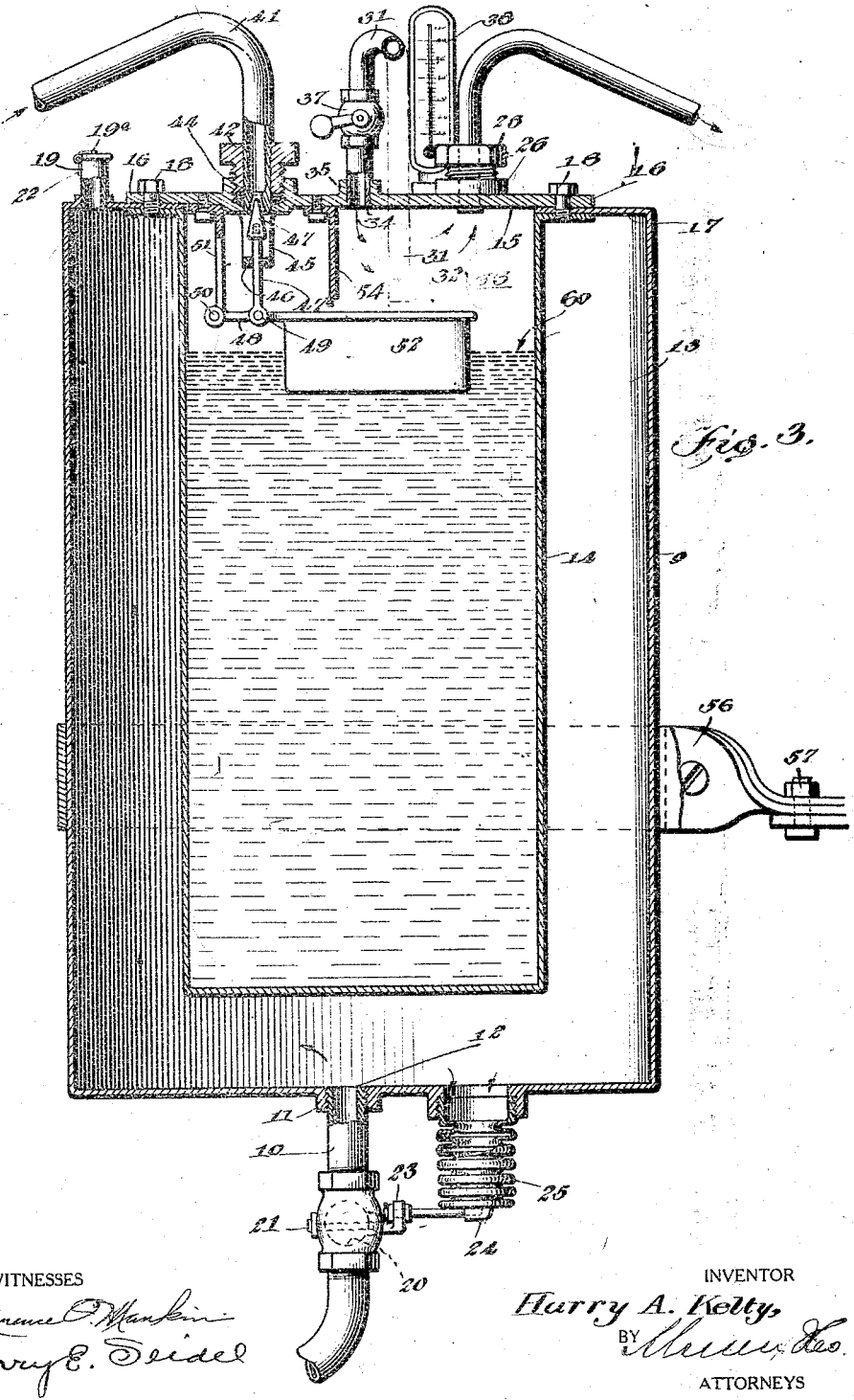
Figure 3 is a vertical section of the combined vaporizer and charge forming device.

The vaporizing device, shown more particularly in Figure 3, has an outer casing 9 which is in communication with the exhaust manifold 6 by means of a by-pass 10. This by-pass is connected to a nipple 11 embracing an inlet opening 12 through which the exhaust gases from the manifold 6 pass to enter a heating chamber 13 in the casing 9 and which is limited in capacity by an inner container 14.

The inner casing is provided with a removable top closure 15 having a lateral extension 16 resting on an annular top 17 of the outer casing 9. The top of the outer casing is provided with a passage through which is inserted the container 14. The flange 16 at the top of the container 14 is bolted or riveted as shown at 18 to the top 17 of the casing 9 so that the annular wall of the container 14 will form an inner wall of the heating chamber 13, and the chamber 13 of the casing 9 will be sealed against the loss of exhaust gases. The top 17 of the casing 9 is provided with a short pipe 19 having its inner end in communication with the chamber 13 and its outer end controlled by a hinged valve 19ª. The valve is retained in closed position against a predetermined exhaust pressure by a spring 22.

The conduit 10 is normally open to the exhaust manifold 6 but is closed by a valve 20 carried upon and operated by a shaft 21. The shaft is actuated by a crank 23 which in turn is operated by an arm 24 of a thermostat 25 which is secured to the bottom of the casing 9 and in open communication with the heating chamber 13 so that the operation of the valve 20 is affected by the temperature changes in the heating chamber.

The closure 15 is provided with a hollow boss 26 through which is inserted one end of a pipe 27. The pipe is maintained in the boss by means of a gland 28 screwed into said boss. The other end of the pipe 27 is directly connected, as shown at 29, with the intake manifold 7 at a point between the carbureter and the engine cylinder. The pipe 27 is adapted to conduct aqueous and alcoholic vapors from the solution 30 in the container 14, said pipe opening at a point in the container which is above the level of the liquid in the same.

An air pipe 31 has its lower end 32 in open communication with the atmosphere and extends downwardly on the outside of the container 9 while its inner end is in open communication as shown at 34 with a space 33 above the level of the liquid in the container and is connected to the closure 15 in any approved manner where it is inserted through a hollow boss 35. A manually controlled valve 37 in the pipe 31 is adapted to close communication between the atmosphere and the container 14. If it be desired at any time to draw into the engine cylinders a charge of unadulterated alcohol, a container sufficiently filled with alcohol is so placed that the lower end 32 of the pipe 31 will be inserted within the alcohol whereby the alcohol is drawn through the pipe 31 into the space 33 and then through the pipe 27 to the intake manifold and then to the engine cylinder. Furthermore if it be desired to draw in a richer charge of aqueous and alcoholic vapors from the container 14 it is only necessary to close the valve 37 for the purpose. A thermometer 38 is secured in an opening in the closure 15 for the container 14 so that the inner end of the thermometer will be directly affected by the temperature in the container so that it will be possible at all times to determine the degree of temperature of the vapors in the space 33.

The container 14 is supplied with alcohol and water from a tank 40 through a pipe 41. The tank 40 may be placed above the gasoline tank 2 or in any other convenient position which is suitable for the purpose and which may be varied because of the differences in construction in the various types of automobiles. Pipe 41, as shown in Figure 1, is carried in close association with the exhaust pipe 6 in order that the solution of alcohol and water may be heated on its way to the container 14 for not only aiding in hastening the evaporation of the water and alcohol but for creating a slight pressure on the alcohol and water in the tank 40 and pipe 41 so that the alcohol and water will tend to be forced into the container 14. One end of the pipe 41 is connected by means of a threaded gland 42 to an internally threaded hollow boss 43.

A valve seat 44 is provided below the pipe 41 and is carried by a bracket 45. This bracket is secured to the inner face of the cover 15 and is provided with a bearing 46 to receive and guide a valve stem 47ª of a valve 47. The valve stem is pivoted to a float arm 48 as shown at 49, the float arm being pivoted at 50 to a bracket arm 51 which is secured to the inner face of the closure 15. A float 52 is attached to the arm 48 and is limited in its upward movement by a baffle 54 which depends from the cover 15 into the space 33 above the solution 30 in the container 14 and transversely of said space in order to partially isolate the inner open end of the pipe 41 from the air pipe 31.

A casing 9 may be either directly connected to the dash 55 or as shown in Figure 1 attached by means of straps 56 which embrace the casing 9 and has its ends secured by means of bolts 57 to a bracket 58, said bracket being secured to the engine by bolts 57 which are employed normally to secure the crank case to the engine cylinders.

The operation of my device is as follows:

The tank 40 may be of any capacity, the size being only limited by the space in the automobile which it is determined it should occupy. This tank is filled with a solution formed of alcohol forming approximately from 60% to 80% of the quantity of the solution and water forming the remaining portion, and the container 14 is initially filled to the level indicated by the numeral 60 with alcohol and water in equal proportions. The air valve 37 will be open and the exhaust valve 20 will likewise be maintained in open position by means of the thermostat 25. The engine is started and is operated by means of gasoline from the tank 2 and the carbureter 8. As soon as the exhaust gases are discharged through the pipe 6 and by means of the by-pass 10 said gases are admitted to the heating chamber 13 through the by-pass 10 and past the open valve 20 and the container 14 is then heated and vapors from the alcohol and water are drawn in, together with a predetermined quantity of air, from pipe 31 through the space 33 and then through pipe 27 and into the intake manifold 7 where the air and vapors are mixed with the combustible mixture. This enriched mixture is then employed for operating the pistons.

The hinged valve 19$^a$ is held upon its seat at the outer end of the pipe 19 by means of the spring 22 and the strength of the spring is such that it is adapted to maintain the valve closed up to a predetermined pressure. Beyond this point the valve is open to permit the exhaust gases to escape.

It will be appreciated that while the valve 19 permits exhaust gases to escape this will only happen at certain times due to the fact that when the engine is operating the valve 20 will be controlled in its opening or closing movements by the thermostat 25 and since the thermostat will open and close the valve at a predescribed degree of temperature the pressure from the exhaust gases will not always be sufficient to open the valve 19$^a$ to permit escape of gases. This valve may also be manually operated to open position at any time it is desired to cause a circulation of the exhaust gases in the heating chamber 13. However, the heating chamber 13 generally forms a dead pocket for the exhaust gases. The valve 19$^a$ is only opened against the tension of the spring 22 upon an excess of pressure in the heating chamber and which excess pressure is sufficient to overcome the tension of the spring.

Since the alcohol in the solution 30 and located in the container 14 evaporates at a lower temperature than the water the vapor formed in the space 33 will have a greater percentage of alcohol than water but due to the fact that the percentage of alcohol is considerably greater than the percentage of water in the tank 40 the proportions in the tank 30 will be substantially maintained. Since it is intended that the water and alcohol which enter the container 14 when the float 52 is lowered by reason of the lowering of the level 60 of the solution, be maintained at a definite level the valve 47 will be opened by the lowering of the float to admit sufficient solution from the tank 40 into pipe 41 to container 14 to maintain the level substantially constant. The proportions employed in the tank 40 should be such in connection with the proportions of the alcohol and water in the container 14 that as the vapors are formed from the solution in container 14 and a greater percentage of alcohol is carried off than water the quantity of alcohol and water delivered to the container 14 will always maintain approximately a solution having 50% alcohol and 50% water. Furthermore the temperature maintained in the container 14 by the heating chamber 13 should be such as to provide for a definite proportion between the aqueous and the alcoholic vapors so that too great a quantity of the alcohol will not be evaporated from the container 14 in proportion to the quantity of water evaporated.

The pipe 27 is of restricted diameter so that too great a quantity of the vapors will not be drawn into the engine and thereby waste the alcohol.

In order to fill the container 14 it is only necessary to initially prepare a mixture of alcohol and water of equal proportions and insert the outer end 32 of the tube 31 in the solution and as the engine is operated the solution will be drawn in and properly fill the container 14.

When it is desired to remove a heavy coating of carbon from an engine to which my device has been applied the container 14 is filled with alcohol and a finger applied to the outer end 32 of the pipe 31. Alcohol then is drawn into the engine and vaporized and will cause the removal of the carbon coating the cylinder head and the pistons or the container which is provided with alcohol may be so placed that the lower end 32 of the pipe 31 is immersed in the alcohol and when the engine is operated with the throttle wide open the alcohol is drawn through the space 33 from the container 14 through pipe 27 so that the engine is being supplied with alcohol instead of being supplied with vapor from the mixture in the casing 14. By this means the engine is initially cleaned of all carbon before the device constructed in accordance with the principles of my invention is placed in active operation on the engine in order that the best results may be obtained from the device. When it is noticed that the exhaust gases are free of black soot which is being discharged by reason of the admission of the alcohol, the container may be removed from the conduit 31 to permit the auxiliary charge forming device to operate in a normal manner and supply the engine with a limited quantity of vapors formed from alcohol and water and in the proportions stated above.

What I claim is:

1. In an internal combustion engine having intake and exhaust manifolds, a device for introducing a vapor into the engine cylinders comprising a casing, a container disposed within the casing and adapted to be partially filled with a mixture of alcohol and water, means for admitting air to the container above the liquid, a tube connecting the casing with the exhaust conduit of the engine to supply the space between the container and the casing with a dead pocket of exhaust gases for heating the liquid in the container to a predetermined degree, and a conduit connecting the container with the intake manifold of the engine for supplying a limited but predetermined quantity of vapor to the intake manifold.

2. In an internal combustion engine having intake and exhaust manifolds, a device for introducing a vapor into the engine cylinders comprising a casing, a container disposed within the casing and adapted to be partially filled with a mixture of alcohol and water, means for admitting air to the container above the liquid, a tube connecting the casing with the exhaust conduit of the engine to supply the space between the container and the casing with a dead pocket of exhaust gases for heating the liquid in the container to a predetermined degree, a conduit connecting the container with the intake manifold of the engine for supplying a limited but predetermined quantity of vapor to the intake manifold, a valve for controlling the flow of the exhaust gases into the casing, and a discharge conduit for the exhaust gases and a valve in the conduit for controlling the discharge of the gases from the casing.

3. In an internal combustion engine having intake and exhaust manifolds, a device for introducing a vapor into the engine cylinders comprising a casing, a container disposed within the casing and adapted to be partially filled with a mixture of alcohol and water, means for admitting air to the container above the liquid, a tube connecting the casing with the exhaust conduit of the engine to supply the space between the container and the casing with a dead pocket of exhaust gases for heating the liquid in the container to a predetermined degree, a conduit connecting the container with the intake manifold of the engine for supplying a limited but predetermined quantity of vapor to the intake manifold, a valve in the tube for closing the casing to the exhaust manifold for pocketing a predetermined quantity of the exhaust gases in said casing.

4. In an internal combustion engine having intake and exhaust manifolds, a device for introducing a vapor into the engine cylinders comprising a casing, a container disposed within the casing and adapted to be partially filled with a mixture of alcohol and water, a tube connecting the casing with the exhaust conduit of the engine to supply the space between the container and the casing with a dead pocket of exhaust gases for heating the liquid in the container to a predetermined degree, a conduit connecting the container with the intake manifold of the engine for supplying a limited but predetermined quantity of vapor to the intake manifold, a valve in the tube for closing the casing to the exhaust manifold for pocketing a predetermined quantity of the exhaust gases in the casing, a tube connected with the container adapted to admit air to said container and also when desired to draw in a fresh charge of liquid.

5. In an internal combustion engine having intake and exhaust manifolds, a device for introducing a vapor into the engine cylinders comprising a casing, a container disposed within the casing and adapted to be partially filled with a mixture of alcohol and water, a tube connecting the casing with the exhaust conduit of the engine to supply the space between the container and casing with a dead pocket of exhaust gases for heating the liquid in the container to a predetermined degree, a conduit connecting the container with the intake manifold of the engine for supplying a limited but predetermined quanity of vapor to the intake maniforld, a valve in the tube for closing the casing to the exhaust manifold for pocketing a predetermined quantity of the exhaust gases in the casing, and means for releasing the pocketed exhaust gases when desired.

6. In an internal combustion engine having intake and exhaust manifolds, a device for introducing a carbon removing liquid into the engine cylinders and for introducing vapors formed from a mixture of substantially equal proportions of alcohol and water and comprising a container adapted to be partially filled with a mixture of alcohol and water to such a height as to provide a space above the level of the liquid mixture and the top of the container, a tube open at one end to the atmosphere for supplying normally a predetermined quantity of air to the space above the level of the liquid and the top of said container, a heating chamber surrounding the container and connected with the exhaust manifold whereby the heating chamber is filled with a dead pocket of exhaust gases for maintaining the heating chamber at a predetermined temperature to convert the liquid in the container into vapor, a second tube connecting the top of the container above the level of the liquid with the intake manifold, said first mentioned tube being adapted to be initially inserted in unadulterated alcohol for supplying the engine with alcohol for initially removing carbon before the vapors are drawn in from the casing, said unadulterated alcohol being drawn through the first mentioned tube through the space above the level of the liquid in the top of the container and through the second mentioned tube to the intake manifold.

7. In an internal combustion engine, a device for introducing a vapor formed of alcohol and water into the engine cylinders comprising a container adapted to be partially filled with a solution of equal proportions of alcohol and water, means for admitting air to the container above the liquid, means for heating the container, and means for supplying a solution formed of alcohol and water to the container, the percentage of the alcohol in the solution being greater than the percentage of water.

8. In an internal combustion engine, a device for introducing a vapor formed of alcohol and water into the engine cylinders comprising a container adapted to be partially filled with a solution of equal proportions of alcohol and water, means for admitting air to the container above the liquid, means for heating the container, and means for supplying a solution formed of alcohol and water to the container, the percentage of the alcohol in the solution being greater than the percentage of water, and a controlling means for causing the heating means to maintain a predetermined degree of temperature in the container.

9. In an internal combustion engine having intake and exhaust manifolds, a device for introducing vapor formed of alcohol and water into the engine cylinders and comprising a container adapted to be partially filled with a solution of alcohol and water, means for admitting air into the container above the liquid, a casing embracing the container and forming a heating chamber, a by-pass connecting the casing with the exhaust manifold, a valve controlling the flow of exhaust gases to the casing, a hinged valve, a spring for maintaining the valve closed against a predetermined pressure of the exhaust gases in the casing, a pipe connecting the intake manifold with the container above the level of the liquid, and means for maintaining the container supplied with a predetermined quantity of a solution of alcohol and water.

10. In an internal combustion engine having intake and exhaust manifolds, a device for introducing vapor formed of alcohol and water into the engine cylinders and comprising a container adapted to be partially filled with a solution of alcohol and water, means for admitting air into the container above the liquid, a casing embracing the container and forming a heating chamber, a by-pass connecting the casing with the exhaust manifold, a valve controlling the flow of exhaust gases to the casing, a hinged valve, a spring for maintaining the valve closed against a predetermined pressure of the exhaust gases in the casing, a pipe connecting the intake manifold with the container above the level of the liquid.

11. A method of forming a supplemental charge for an internal combustion engine which comprises heating a predetermined quantity of a solution of approximately equal parts of alcohol and water to provide a vapor, periodically adding to the solution a solution of alcohol and water in which the alcoholic content is greater than the aqueous content.

12. The method of forming a supplemental charge for an internal combustion engine which comprises maintaining a predetermined quantity of a solution of approximately equal parts of alcohol and water at a constant temperature, and conducting the vapors thus formed to the intake manifold of the engine.

13. The method of forming a supplemental charge for an internal combustion engine which comprises maintaining a predetermined quantity of a solution of approximately equal parts of alcohol and water at a constant and predetermined temperature to provide a vapor, periodically adding to the solution a solution of alcohol and water of which the alcoholic content is greater than the aqueous content, and conducting the vapors formed to the intake manifold of the engine.

14. The method of forming a supplemental charge for an internal combustion engine which comprises maintaining a predetermined quantity of a solution of alcohol and water at a predetermined degree of temperature to provide a vapor in which the alcoholic content is greater than the aqueous content, adding air to the vapor and conducting the charge thus formed to the intake manifold of the engine.

15. The method of forming a supplemental charge for an internal combustion engine which comprises maintaining a predetermined quantity of a solution of approximately equal parts of alcohol and water at a constant temperature to form a vapor, and conducting the vapor into the main charge of combustible mixture passing through the intake manifold of the engine.

16. In an internal combustion engine having intake and exhaust manifolds, a device for introducing vapor formed of alcohol and water into the engine cylinders and comprising a container adapted to be partially filled with the solution of alcohol and water, means for admitting air to the container above the liquid, a heating chamber embracing the container, a pipe connecting the container with the intake manifold of the engine, and means for automatically supplying the container with alcohol and water and comprising a tank, a pipe connected with the tank and in communication with the container, a valve for controlling the communication between the pipe and the container, a float in the container connected with the valve for normally maintaining the valve closed.

17. In an internal combustion engine having intake and exhaust manifolds, a device for introducing vapor formed of alcohol and water into the engine cylinders and comprising a container adapted to be partially filled with the solution of alcohol and water, means for admitting air to the container above the liquid, a heating chamber embracing the container, a pipe connecting the container with the intake manifold of the engine, and means for automatically supplying the container with alcohol and water and comprising a tank, a pipe connected with the tank and in communication with the container, a valve for controlling the communication between the pipe and the container, a float in the container connected with the valve for normally maintaining the valve closed a baffle located between the air admitting means and the valve and having its lower end disposed above the level of the liquid.

18. In an internal combustion engine having intake and exhaust manifolds, a device for introducing vapor formed of alcohol and water into the engine cylinders, and comprising a container adapted to be partially filled with a solution of alcohol and water, an air port for admitting air to the container above the level of the liquid, a heating chamber embracing the container, a pipe connecting the container with the intake manifold, the container being provided with an inlet port for the admission of alcohol and water, a storage tank, a pipe connecting the storage tank with said inlet port, and a valve controlling said port, a float in the container for causing the valve to maintain the port closed, and a baffle located between the inlet port for air and the inlet port for water and alcohol to prevent the alcohol and water to be directly drawn into the pipe leading to the intake manifold.

19. In an internal combustion engine having intake and exhaust manifolds, a device for introducing vapor formed of alcohol and water into the engine cylinders, and comprising a container adapted to be partially filled with a solution of alcohol and water, an air port for admitting air to the container above the level of the liquid, a heating chamber embracing the container, a pipe connecting the container with the intake manifold, the container being provided with an inlet port for the admission of alcohol and water, a storage tank, a pipe connecting the storage tank with said inlet port, and a valve controlling said port, a float in the container for causing the valve to maintain the port closed, and a baffle located between the inlet port for air and the inlet port for water and alcohol to prevent the alcohol and water to be directly drawn into the pipe leading to the intake manifold, said baffle having its lower end terminating above the float and adapted to limit the upward movement of the float.

20. In an internal combustion engine having intake and exhaust manifolds, a device for introducing vapor formed of alcohol and water into the engine cylinder comprising a container adapted to be partially filled with a solution of alcohol and water, means for admitting air into the container above the liquid, a casing embracing the container and forming a heating chamber, a by-pass connecting the casing with the exhaust manifold, a valve for controlling the flow of exhaust gases to the casing, and a thermostat associated with the heating chamber and connected with the valve for causing automatic closing of the valve at a predetermined temperature of the heating chamber.

21. A method of forming a supplemental charge for an internal combustion engine which comprises maintaining a solution of predetermined proportions of alcohol and water at a constant temperature to provide alcoholic and aqueous vapors, and maintaining the proportions of the solution of alcohol and water constant.

HARRY A. KELTY.